United States Patent
Nakazawa et al.

(10) Patent No.: US 11,067,195 B2
(45) Date of Patent: Jul. 20, 2021

(54) ACTUATOR, VALVE DEVICE, AND FLUID CONTROL APPARATUS

(71) Applicant: FUJIKIN INCORPORATED, Osaka (JP)

(72) Inventors: Masahiko Nakazawa, Osaka (JP); Nobuo Nakamura, Osaka (JP); Tomohiro Nakata, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/832,448

(22) Filed: Mar. 27, 2020

(65) Prior Publication Data

US 2020/0248833 A1 Aug. 6, 2020

Related U.S. Application Data

(63) Continuation of application No. PCT/JP2018/035379, filed on Sep. 25, 2018.

(30) Foreign Application Priority Data

| Sep. 28, 2017 | (JP) | ............................. | JP2017-188104 |
| Sep. 28, 2017 | (JP) | ............................. | JP2017-188116 |
| Nov. 29, 2017 | (JP) | ............................. | JP2017-228568 |

(51) Int. Cl.
*F16K 31/44* (2006.01)
*F16K 31/122* (2006.01)
*F16K 31/163* (2006.01)

(52) U.S. Cl.
CPC .......... *F16K 31/44* (2013.01); *F16K 31/1221* (2013.01); *F16K 31/163* (2013.01)

(58) Field of Classification Search
CPC .... F16K 31/163; F16K 31/1221; F16K 31/44; F16H 21/44
See application file for complete search history.

(56) References Cited

U.S. PATENT DOCUMENTS

| 3,812,766 A | * | 5/1974 | Weiss | .................... F15B 15/204 92/14 |
| 4,549,719 A | * | 10/1985 | Baumann | .............. F16H 25/183 100/291 |

(Continued)

FOREIGN PATENT DOCUMENTS

| JP | 2003156167 A | 5/2003 | |
| JP | 2012211682 A | 11/2012 | |
| WO | WO-2018110132 A1 | * 6/2018 | ............... F16K 7/17 |

OTHER PUBLICATIONS

International Search Report for International Application PCT/2018/035379, dated Dec. 18, 2018.

*Primary Examiner* — Umashankar Venkatesan
(74) *Attorney, Agent, or Firm* — Cantor Colburn LLP

(57) ABSTRACT

An actuator includes: a casing; a reciprocating member provided in the casing to be reciprocatable; a drive part provided in the casing to drive the reciprocating member; a booster mechanism which is configured to amplify a drive force applied by the drive part to the reciprocating member; and a moving member which is configured to move on receiving the force amplified by the booster mechanism. The booster mechanism includes a plurality of levers which are arranged in a circumferential direction of the moving member. Each of the levers has an effort portion which is configured to receive the force from the reciprocating member, a fulcrum portion which is configured to come into contact with the casing to serve as a center of a revolution of the lever, and a load portion which is configured to transmit the force to the moving member.

8 Claims, 12 Drawing Sheets

(56) References Cited

U.S. PATENT DOCUMENTS

| | | | | |
|---|---|---|---|---|
| 4,609,178 | A * | 9/1986 | Baumann | F16H 25/183 |
| | | | | 251/229 |
| 4,729,544 | A * | 3/1988 | Baumann | F16H 21/44 |
| | | | | 251/129.05 |
| 4,875,404 | A * | 10/1989 | Aldridge | F16K 31/163 |
| | | | | 92/130 A |
| 4,955,582 | A * | 9/1990 | Baumann | F16K 7/123 |
| | | | | 251/331 |
| 5,108,069 | A * | 4/1992 | Tada | F16K 7/16 |
| | | | | 251/58 |
| 5,516,075 | A * | 5/1996 | Itoi | F16K 31/163 |
| | | | | 251/58 |
| 6,059,259 | A * | 5/2000 | Gregoire | F16K 7/14 |
| | | | | 251/331 |
| 6,547,214 | B2 * | 4/2003 | Gregoire | F16K 17/048 |
| | | | | 251/58 |
| 9,151,403 | B2 * | 10/2015 | Webster | F16K 31/1221 |
| 9,416,893 | B2 * | 8/2016 | Yakushijin | F16K 27/0236 |
| 2004/0061084 | A1 * | 4/2004 | Baumann | F16K 31/1262 |
| | | | | 251/58 |
| 2005/0269534 | A1 * | 12/2005 | Tanikawa | F16K 31/165 |
| | | | | 251/63.5 |

* cited by examiner

ACTUATOR, VALVE DEVICE, AND FLUID CONTROL APPARATUS

CROSS REFERENCE TO RELATED APPLICATION

This application is a continuation application of International Application No. PCT/JP2018/035379, filed Sep. 25, 2018, which claims priority to Japanese Patent Applications No. 2017-188104, filed Sep. 28, 2017, No. 2017-188116, filed Sep. 28, 2017, and No. 2017-228568, filed Nov. 29, 2017. The contents of these applications are incorporated herein by reference in their entirety.

TECHNICAL FIELD

The present disclosure relates to an actuator, a valve device, and a fluid control apparatus which are used for a fluid pipeline in a semiconductor manufacturing device or the like.

BACKGROUND

There is proposed a valve device including a booster mechanism which amplifies a force by means of a flexible biasing member using the principle of leverage (see, e.g., U.S. Pat. No. 6,059,259).

SUMMARY

However, in the booster mechanism disclosed in U.S. Pat. No. 6,059,259, a distortion develops in the biasing member. Consequently, the booster mechanism has low durability and cannot be used in a valve device which is opened/closed a large number of times.

It is therefore an object of the present disclosure to provide an actuator, a valve device, and a fluid control apparatus each including a booster mechanism having excellent durability.

An actuator in accordance with one or more embodiments includes: a casing; a reciprocating member provided in the casing to be reciprocatable; a drive part provided in the casing to drive the reciprocating member; a booster mechanism which is configured to amplify a drive force applied by the drive part to the reciprocating member; and a moving member which is configured to move on receiving the force amplified by the booster mechanism. The booster mechanism includes a plurality of levers which are arranged in a circumferential direction of the moving member and are configured to be not deformed when the drive force is amplified. Each of the levers has an effort portion which is configured to receive the force from the reciprocating member, a fulcrum portion which is configured to come into contact with the casing to serve as a center of a revolution of the lever, and a load portion which is configured to transmit the force to the moving member.

A valve device in accordance with one or more embodiments includes: a body in which a fluid passage is formed; a valve body which is configured to open and close the fluid passage; a casing which is connected to the body; a reciprocating member provided in the casing to be reciprocatable; a drive part provided in the casing to drive the reciprocating member; a booster mechanism which is configured to amplify a drive force applied by the drive part to the reciprocating member; and a moving member which is configured to move closer to and away from the body to cause the valve body to open and close the fluid passage, and is configured to move on receiving the force amplified by the booster mechanism. The booster mechanism includes a plurality of levers which are arranged in a circumferential direction of the moving member and are configured to be not deformed when the drive force is amplified. Each of the levers has an effort portion which is configured to receive the force from the reciprocating member, a fulcrum portion which is configured to come into contact with the casing to serve as a center of a revolution of the lever, and a load portion which is configured to transmit the force to the moving member.

A fluid control apparatus in accordance with one or more embodiments includes a plurality of fluid controllers. At least one of the plurality of fluid controllers is the valve device described above.

BRIEF DESCRIPTION OF THE DRAWINGS

In the drawings:

FIG. 3A illustrates a perspective view illustrating a state in which first levers (second levers) and a first retainer (second retainer) are assembled, while

DETAILED DESCRIPTION

Figure 1:
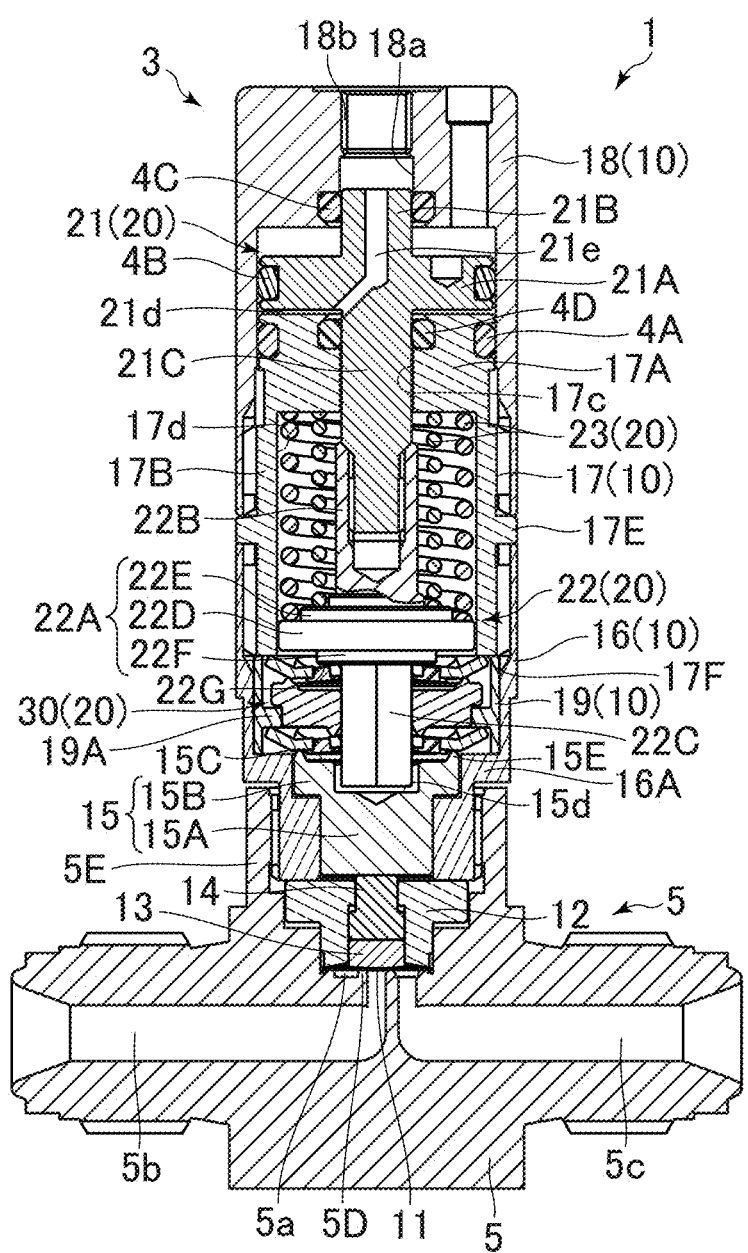
FIG. 1 illustrates a vertical cross-sectional view of a valve device in a closed state according to a first embodiment.

Referring to the drawings, a description will be given of an actuator, a valve device, and a fluid control apparatus each according to an embodiment of the present disclosure.

A description will be given of the actuator and the valve device each according to the first embodiment.

FIG. 1 illustrates a vertical cross-sectional view of a valve device 1 in a closed state in the first embodiment. As illustrated in FIG. 1, the valve device 1 is a diaphragm valve for use in a gas line (e.g., on a most upstream side of the gas line) including a plurality of fluid controllers of a fluid control apparatus 55 (see FIG. 13).

The valve device 1 includes a body portion 2 and an actuator 3. Note that the description will be given below on the assumption that the actuator 3 is on an upper side of the valve device 1, while the body portion 2 is on a lower side of the valve device 1.

The body portion 2 includes a body 5 and a diaphragm 11.

In the body 5, a cylindrical valve chamber 5a, and an inflow path 5b and an outflow path 5c each communicating with the valve chamber 5a are formed. Around a peripheral edge (opening of the inflow path 5b) of a portion of the body 5 in which the inflow path 5b and the valve chamber 5a communicate with each other, an annular valve seat 5D is provided to protrude toward a casing 10. The valve seat 5D is formed of the same metal material as that forming the body 5. The body 5 has a cylindrical portion 5E provided so as to extend upwardly, having a cylindrical shape, and having an internal thread portion formed in an inner peripheral portion thereof.

The diaphragm 11 includes a plurality of diaphragms, has an outer peripheral edge portion thereof pressed by an annular retaining adapter 12, and is held with respect to the body 5. The diaphragm 11 as a valve body is in the form of a spherical shell and has an upwardly protruding arc shape in a natural state. The diaphragm 11 moves away from and comes into contact with the valve seat 5D to provide or cut off communication between the inflow path 5b and the outflow path 5c. When the valve device 1 is in the closed state, the diaphragm 11 comes into contact with the valve seat 5D to cut off the communication between the inflow path 5b and the outflow path 5c. When the valve device 1 is in an open state, the diaphragm 11 moves away from the valve seat 5D to provide the communication between the inflow path 5b and the outflow path 5c.

The actuator 3 includes the casing 10, the retaining adapter 12, a diaphragm retainer 13, a rod 14, a moving member 15, a drive part 20, and first to fourth O-rings 4A to 4D.

The casing 10 includes a bonnet 16, an intermediate casing 17, an actuator cap 18, and a support ring 19.

The bonnet 16 has a generally cylindrical shape and has an external thread portion formed on an outer periphery of a lower end portion thereof. The external thread portions are screwed into the cylindrical portion 5E of the body 5 to fix the bonnet 16 to the body 5. In and around an inner periphery of an upper end portion of the bonnet 16, an internal thread portion is formed.

The intermediate casing 17 has a generally cylindrical shape and has an upper portion 17A and a lower portion 17B. In the upper portion 17A, a through hole 17c is formed while, in the lower portion 17B, a containing hole 17d having an inner diameter larger than that of the through hole 17c is formed. Around an outer periphery of the lower portion 17B, a protruding portion 17E is provided to protrude outwardly. In and around an outer peripheral surface of the lower portion 17B which is located above and below the protruding portion 17E, respective external thread portions are formed. The external thread portion below the protruding portion 17E is screwed into the internal thread portion in the upper end portion of the bonnet 16 to fix the intermediate casing 17 to the bonnet 16. A lower end of the lower portion 17B has an annular lower surface 17F. The lower surface 17F is configured such that an inner diameter side thereof is located inward of an inner peripheral surface of the support ring 19 described later. In and around an outer periphery of the upper portion 17A, the first O-ring 4A is provided to prevent a drive fluid from leaking out of a fluid inlet chamber 21d described later.

The actuator cap 18 has a generally cylindrical shape and has an internal thread portion provided on an inner periphery of a lower end portion. The internal thread portion is screwed with the external thread portion above the protruding portion 17E of the intermediate casing 17 to fix the actuator cap 18 to the intermediate casing 17. In the actuator cap 18, a fluid inflow path 18a through which the drive fluid flows in is formed. In an upper end portion of the fluid inflow path 18a, a counter-screw portion 18b into which a pipe joint not shown is to be screwed is formed.

The support ring 19 has a cylindrical shape and is disposed on a stepped portion 16A provided around an inner periphery of the bonnet 16. An upper end of the support ring 19 is in contact with the lower surface 17F of the intermediate casing 17, while a lower end of the support ring 19 is in contact with the stepped portion 16A provided around the inner periphery of the bonnet 16. As a result, the support ring 19 is vertically unmovable relative to the bonnet 16. In addition, around an inner periphery of the support ring 19, a protruding portion 19A is provided to protrude inwardly.

The diaphragm retainer 13 is provided over the diaphragm 11 and supported by the retaining adapter 12 to be vertically movable and capable of pushing a center portion of the diaphragm 11.

The rod 14 is provided over the diaphragm retainer 13 and supported by the retaining adapter 12 to be vertically movable and capable of pushing the diaphragm retainer 13.

The moving member 15 is supported in a lower end portion of the bonnet 16 to be vertically movable. The moving member 15 has a cylindrical portion 15A and a flange portion 15B. The cylindrical portion 15A is capable of pushing the rod 14. The flange portion 15B is provided over an upper portion of the cylindrical portion 15A so as to protrude outwardly. In a center portion of an upper surface 15C of the flange portion 15B, a recessed portion 15d is formed. An outer peripheral edge of the flange portion 15B is provided with an annular first projecting portion 15E projecting upwardly.

The drive part 20 includes a piston 21, a spring bearing member 22, two coil springs 23, and a booster mechanism 30. The drive part 20 is a drive part of a pneumatic drive type. Note that the piston 21 and the two coil springs 23 correspond to a drive part, while the spring bearing member 22 corresponds to a reciprocating member.

The piston 21 includes a base portion 21A having a generally disc shape, a first upwardly extending portion 21B extending upwardly from a center portion of the base portion 21A, and a first downwardly extending portion 21C extending downwardly from the center portion of the base portion 21A.

The base portion 21A is located over the upper portion 17A of the intermediate casing 17 in the actuator cap 18. In and around an outer peripheral edge of the base portion 21A, the second O-ring 4B is provided. The second O-ring 4B inhibits radial movement of the base portion 21A during vertical movement of the base portion 21A. A lower surface of the base portion 21A and an upper surface of the upper portion 17A of the intermediate casing 17 form the fluid inlet chamber 21d. The second O-ring 4B prevents the drive fluid from leaking out of the fluid inlet chamber 21d.

An upper portion of the first upwardly extending portion 21B is inserted in the fluid inflow path 18a. The third O-ring 4C inhibits radial movement of the first upwardly extending portion 21B during vertical movement of the first upwardly extending portion 21B. The third O-ring 4C also prevents the drive fluid from leaking to the outside. The piston 21 has a fluid inlet path 21e formed to extend from an upper end of the first upwardly extending portion 21B to the lower surface of the base portion 21A and communicate with the fluid inlet chamber 21d.

The first downwardly extending portion 21C extends through the through hole 17c. The fourth O-ring 4D inhibits radial movement of the first downwardly extending portion 21C during vertical movement of the first downwardly extending portion 21C. The fourth O-ring 4D prevents the drive fluid from leaking out of the fluid inlet chamber 21d. In and around an outer periphery of a lower end portion of the first downwardly extending portion 21C, an external thread portion is formed.

The spring bearing member 22 is located under the piston 21 and includes a spring bearing portion 22A, a second upwardly extending portion 22B, and a second downwardly extending portion 22C. The spring bearing member 22 is provided to be capable of vertically reciprocating together with the piston 21 in the casing 10.

The spring bearing portion 22A includes a disc-shaped main body portion 22D, a disc-shaped upwardly protruding portion 22E protruding upwardly from an upper surface of the main body portion 22D, and a disc-shaped downwardly protruding portion 22F protruding downwardly from a lower surface of the main body portion 22D. The main body portion 22D is located in the intermediate casing 17. The main body portion 22D is configured to have a diameter smaller than the inner diameter of the containing hole 17d of the intermediate casing 17.

The second upwardly extending portion 22B has a bottomed cylindrical shape and is provided so as to extend upwardly from a center portion of the upwardly protruding portion 22E. In and around an inner peripheral surface of the second upwardly extending portion 22B, an internal thread portion is formed to be screwed with the external thread portion of the first downwardly extending portion 21C. Thus, the piston 21 and the spring bearing member 22 are integrally configured.

The second downwardly extending portion 22C is in the form a regular hexagonal prism and is provided so as to extend downwardly from a center portion of the downwardly protruding portion 22F. The second downwardly extending portion 22C is configured such that a lower end thereof is located in the recessed portion 15d of the moving member 15.

The two coil springs 23 are disposed in the containing hole 17d of the intermediate casing 17 to be located between a lower surface of the upper portion 17A and respective upper surfaces of the main body portion 22D and the upwardly protruding portion 22E of the spring bearing portion 22A. The two coil springs 23 constantly bias the spring bearing member 22 downwardly and thereby constantly bias the piston 21 downwardly.

Figure 2:
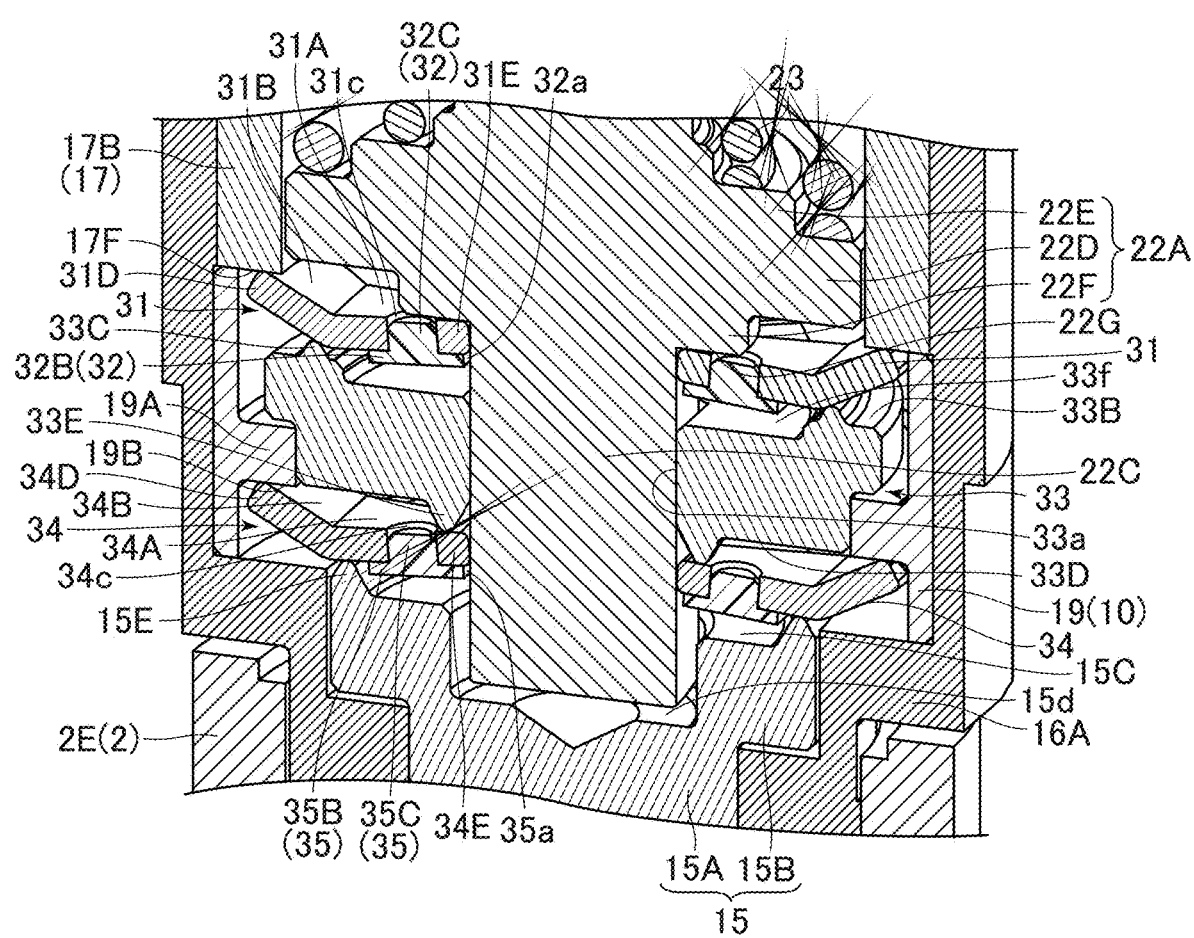
FIG. 2 illustrates a sectional perspective view of the vicinity of a booster mechanism of the valve device according to the first embodiment.
Figure 3A:
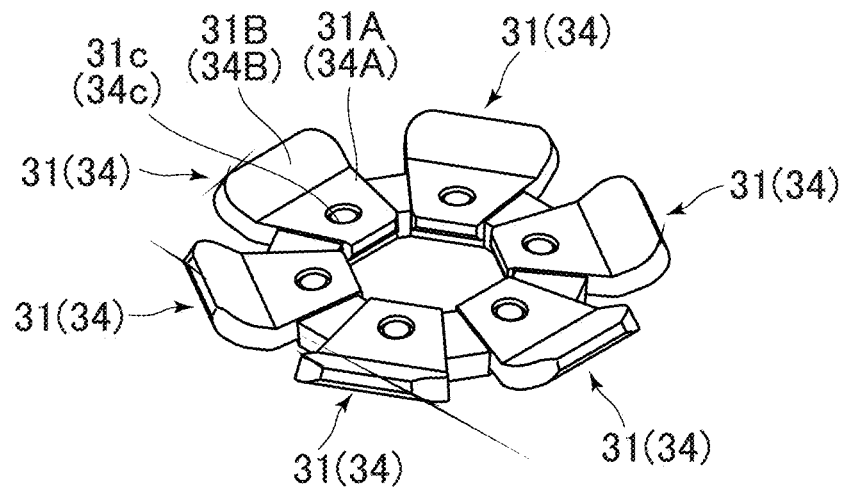
Figure 3B:
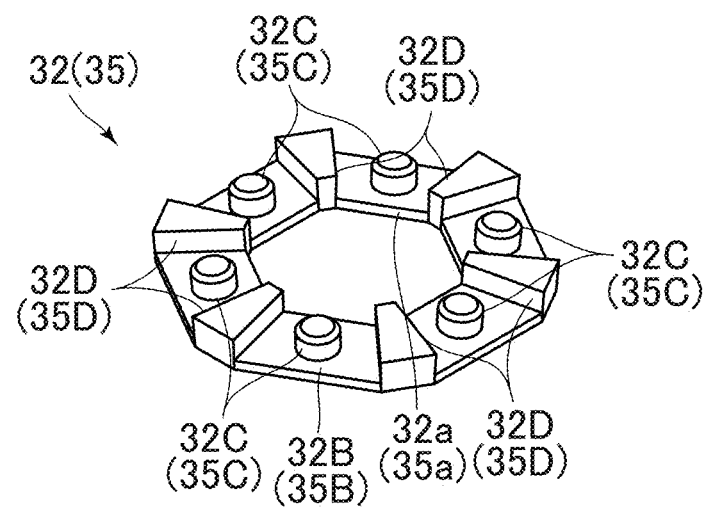
FIG. 3B illustrates a perspective view of the first retainer (second retainer)

FIG. 2 illustrates a sectional perspective view of the vicinity of the booster mechanism 30. FIG. 3A illustrates a perspective view illustrating a state in which first levers 31 (second levers 34) and a first retainer 32 (second retainer 35) are assembled, while FIG. 3B illustrates a perspective view of the first retainer 32 (second retainer 35).

The booster mechanism 30 includes the six first levers 31, the first retainer 32, a transmission member 33, the six second levers 34, and the second retainer 35. The six first levers 31 correspond to a first lever portion, while the six second levers 34 correspond to a second lever portion.

The six first levers 31 are independent of each other, have the same shape, and are equidistantly arranged around the second downwardly extending portion 22C along a circumferential direction of the actuator 3. Each of the first levers 31 is formed of a metal (e.g., stainless steel), a resin, a ceramic, or the like and has hardness which keeps the first lever 31 from being deformed (distorted) during an operation of opening/closing the valve device 1 described later. In other words, each of the first levers 31 functions as a rigid body against the operation of opening/closing the valve device 1. Each of the first levers 31 includes an inner portion 31A and an outer portion 31B and has a shape tapered from the outer portion 31B toward the inner portion 31A. The outer portion 31B is connected to the inner portion 31A so as to be bent upwardly. The inner portion 31A has an engagement hole 31c formed therein.

The first levers 31 are disposed such that outer end portions 31D thereof come into contact with the lower surface 17F of the intermediate casing 17 and inner end portions 31E thereof face individual surfaces of the regular hexagonal prism of the second downwardly extending portion 22C and come into contact with a lower surface 22G of the downwardly protruding portion 22F.

The first retainer 32 is formed of a flexible material such as rubber, has a substantially hexagonal shape in plan view, and has a regular hexagonal insertion hole 32a formed therein. The first retainer 32 includes an annular portion 32B, six engagement projections 32C, and six support projections 32D.

Each of the six engagement projections 32C has a substantially cylindrical shape. The six engagement projections 32C are arranged over the annular portion 32B so as to be equidistant from each other in the circumferential direction of the actuator 3.

Each of the six support projections 32D is provided between the engagement projections 32C adjacent to each other and has a shape tapered toward a center of the annular portion 32B in plan view.

Into the engagement holes 31c of the inner portions 31A of the individual first levers 31, the engagement projections 32C of the first retainer 32 are inserted to allow the first levers 31 to be held by the first retainer 32. Each of the first levers 31 is disposed between the support projections 32D adjacent to each other to have rotation thereof suppressed.

Into the regular hexagonal insertion hole 32a of the annular portion 32B, the second downwardly extending portion 22C in the form of the regular hexagonal prism is inserted. Since the insertion hole 32a has a size slightly larger than that of an outer shape of the second downwardly extending portion 22C, the rotation of the first retainer 32 relative to the second downwardly extending portion 22C is suppressed.

The transmission member 33 is located under the first levers 31 and the first retainer 32, has an annular shape, and has a regular hexagonal insertion hole 33a formed therein. Around an outer peripheral edge of an upper surface 33B of the transmission member 33, an annular second projecting portion 33C is provided to protrude upwardly. The second projecting portion 33C is in contact with the outer portion 31B of each of the first levers 31 from below at a position inward of the outer end portion 31D. Around an inner peripheral edge of a lower surface 33D of the transmission member 33, an annular third projecting portion 33E is provided to protrude downwardly. The third projecting portion 33E is located inward of the second projecting portion 33C. In other words, the positional relationship of the third projecting portion 33E with the second projecting portion 33C is the same as the positional relationship of the inner end portion 31E of each of the first levers 31 with the outer portion 31B thereof. In the upper surface 33B of the transmission member 33, a recessed portion 33f is formed inwardly of the second projecting portion 33C.

Into the regular hexagonal insertion hole 33a of the transmission member 33, the second downwardly extending portion 22C in the form of the regular hexagonal prism is inserted. Since the insertion hole 33a has a size slightly larger than that of the outer shape of the second downwardly extending portion 22C, the rotation of the transmission member 33 relative to the second downwardly extending portion 22C is suppressed.

The six second levers 34 and the second retainer 35 are located under the transmission member 33 and have the same configurations/shapes as those of the six first levers 31 and the first retainer 32.

Specifically, each of the second levers 34 is made of a metal (e.g., stainless steel), a resin, a ceramic, or the like, has hardness which keeps the second lever 34 from being deformed (distorted) during the operation of opening/closing of the valve device 1 described later, and includes an inner portion 34A having an engagement hole 34c formed therein, and an outer portion 34B. The second levers 34 are disposed such that outer end portions 34D thereof come into contact with a lower surface 19B of the protruding portion 19A of the support ring 19 and inner end portions 34E thereof face the individual surfaces of the regular hexagonal prism of the second downwardly extending portion 22C and come into contact with the third projecting portion 33E.

The second retainer 35 has a regular hexagonal insertion hole 35a formed therein. The second retainer 35 has an annular portion 35B, six engagement projections 35C, and six support projections 35D.

Into the engagement holes 34c of the inner portions 34A of the individual second levers 34, the engagement projections 35C of the second retainer 35 are inserted to allow the second levers 34 to be held by the second retainer 35. Each of the second levers 34 is disposed between the support projections 35D adjacent to each other to have rotation thereof suppressed.

Into the regular hexagonal insertion hole 35a of the annular portion 35B, the second downwardly extending portion 22C in the form of the regular hexagonal prism is inserted. Since the insertion hole 35a has a size slightly larger than that of the outer shape of the second downwardly extending portion 22C, the rotation of the second retainer 35 relative to the second downwardly extending portion 22C is suppressed.

Figure 4:
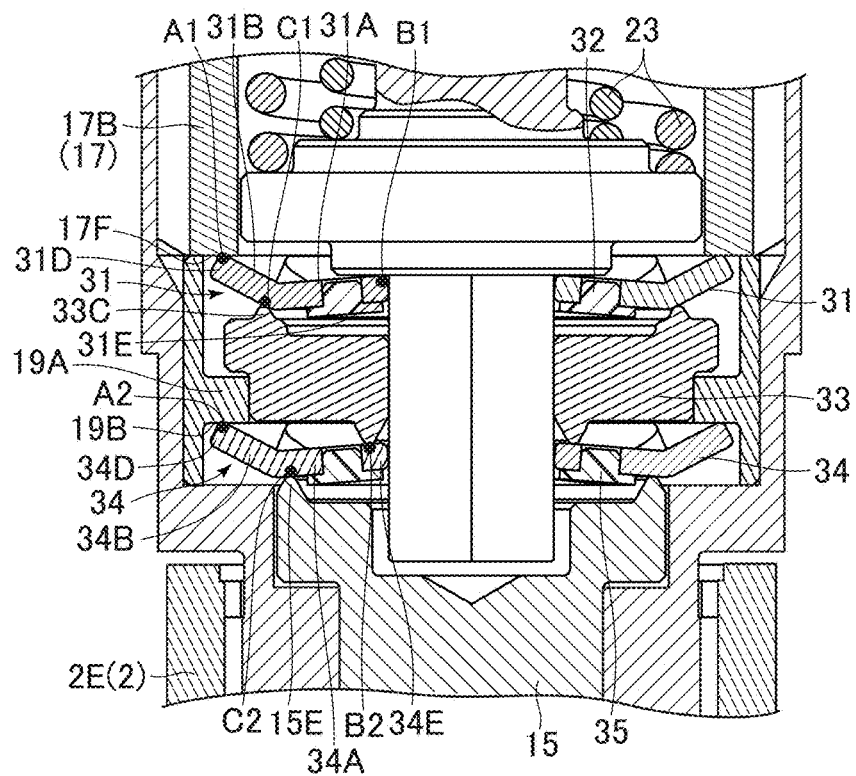
FIG. 4 illustrates a cross-sectional view of the booster mechanism when the valve device according to the first embodiment is in the closed state.

As illustrated in FIG. 1, when the valve device 1 is in a closed state, the drive fluid has not entered the fluid inlet chamber 21d, while the spring bearing member 22 is downwardly biased by the two coil springs 23 to be located at a lowermost end. When the valve device 1 shifts from the open state illustrated in FIG. 5 to the closed state illustrated in FIG. 4, the inner end portion 31E of each of the first levers 31 is pushed by the lower surface 22G of the downwardly protruding portion 22F to revolve around the outer end portion 31D in contact with the lower surface 17F of the intermediate casing 17. As a result, the second projecting portion 33C of the transmission member 33 in contact with the first levers 31 from below is downwardly pushed to downwardly move the transmission member 33.

As a result of the downward movement of the transmission member 33, the inner end portion 34E of each of the second levers 34 is pushed by the third projecting portion 33E of the transmission member 33 to come into contact with the lower surface 19B of the protruding portion 19A of the support ring 19 to revolve around the outer end portion 34D. As a result, the first projecting portion 15E of the moving member 15 in contact with the second lever 34 from below is downwardly pushed to downwardly move the moving member 15.

As a result of the downward pushing of the rod 14 by the moving member 15 and the downward pushing of the diaphragm retainer 13 by the rod 14, the diaphragm 11 is pushed to come into contact with the valve seat 5D and cut off the communication between the inflow path 5b and the outflow path 5c.

In the first embodiment, the two coil springs 23 are configured such that a force (drive force) to push the spring bearing portion 22A of the spring bearing member 22 is amplified by the booster mechanism 30 to push the moving member 15. Specifically, the force is amplified by the principle of leverage using a contact portion A1 of the outer end portion 31D of each of the first levers 31 in contact with the lower surface 17F of the intermediate casing 17 as a fulcrum point, using a contact portion B1 of the inner end portion 31E of the first lever 31 in contact with the lower surface 22G of the downwardly protruding portion 22F as an effort point, and using a contact portion C1 of the outer portion 31B of the first lever 31 in contact with the second projecting portion 33C of the transmission member 33 as a load point, and the amplified force is transmitted to the transmission member 33. Thus, the inner end portion 31E of the first lever 31 corresponds to an effort portion, the outer end portion 31D of the first lever 31 corresponds to a fulcrum portion, and the portion of the outer portion 31B of the first lever 31 in contact with the second projecting portion 33C corresponds to a load portion. The second projecting portion 33C corresponds to a force receiving portion.

The force is further amplified by the principle of leverage using a contact portion A2 of the outer end portion 34D of each of the second levers 34 in contact with the lower surface 19B of the protruding portion 19A of the support ring 19 as a fulcrum point, using a contact portion B2 of the inner end portion 34E of the second lever 34 in contact with the third projecting portion 33E of the transmission member 33 as an effort point, and using a contact portion C2 of the inner portion 34A of the second lever 34 in contact with the first projecting portion 15E of the moving member 15 as a load point, and the amplified force is transmitted to the moving member 15. Note that the inner end portion 34E of the second lever 34 corresponds to an effort portion, the outer end portion 34D of the second lever 34 corresponds to a fulcrum portion, and the portion of the inner portion 34A of the second lever 34 in contact with the first projecting portion 15E corresponds to a load portion. The third projecting portion 33E corresponds to a transmission portion.

Thus, the two coil springs 23 are configured such that the biasing force thereof is amplified by the booster mechanism 30 to push the moving member 15. Accordingly, even when the biasing force of the two coil springs 23 is small, it is possible to push the diaphragm 11 against the pressure of the fluid flowing in the inflow path 5b and cut off the communication between the inflow path 5b and the outflow path 5c.

In addition, as a result of introduction of the drive fluid into the fluid inlet chamber 21d via the fluid inflow path 18a and the fluid inlet path 21e, an upward force resulting from an air pressure acts on the piston 21 and on the spring bearing member 22. This force is increased to be larger than the biasing force of the two coil springs 23 to upwardly move the piston 21 and the spring bearing member 22. As a result, there is no force pushing the moving member 15, and consequently the diaphragm 11 is lifted by the pressure of the fluid flowing in the inflow path 5b and a restorative force of the diaphragm 11 to move away from the valve seat 5D and open the valve.

Figure 5:
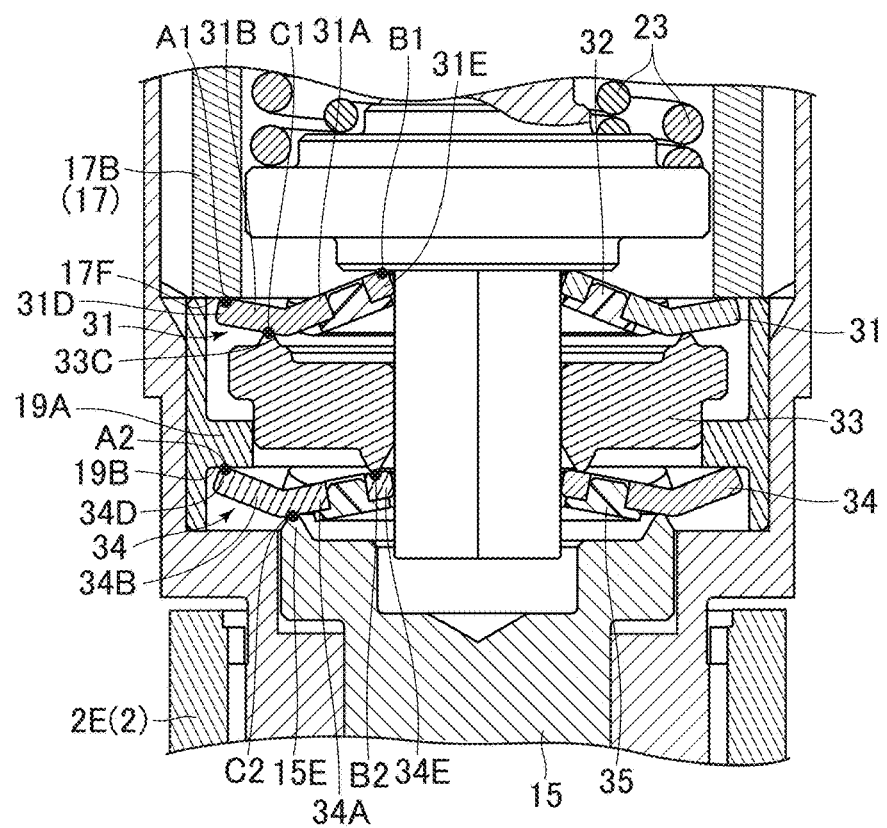
FIG. 5 illustrates a cross-sectional view of the booster mechanism when the valve device according to the first embodiment is in an open state.

At this time, as a result of the lifting of the diaphragm 11, the diaphragm retainer 13 and the rod 14 are lifted, and the moving member 15 is also lifted. Consequently, as illustrated in FIG. 5, each of the second levers 34 is pushed upward by the first projecting portion 15E of the moving member 15 to revolve around the outer end portions 34D thereof, and the inner end portion 34E is lifted. As a result, the third projecting portion 33E of the transmission member 33 is pushed upward by the inner end portion 34E of the second lever 34, and each of the first levers 31 is pushed upward by the second projecting portion 33C of the transmission member 33 to revolve around the outer end portion 31D thereof, and the inner end portion 31E is lifted.

Note that the air pressure required to open the valve is sufficient as long as the air pressure is slightly larger than the biasing force of the two coil springs 23. Since the biasing force of the two coil springs 23 can be reduced by the booster mechanism 30, the air pressure required to open the valve may be low.

Thus, in the valve device 1 including the actuator 3 according to the first embodiment, the booster mechanism 30 includes the plurality of first levers 31 which are not deformed when the biasing force (drive force) of the two coil springs 23 is amplified. Each of the first levers 31 includes the effort portion (inner end portion 31E) which receives the force from the spring bearing portion 22A of the spring bearing member 22, the fulcrum portion (outer end portion 31D) which comes into contact with the lower surface 17F of the intermediate casing 17 to serve as a center of the revolution of the first lever 31, and the load portion (portion of the outer portion 31B which comes into contact with the second projecting portion 33C) which transmits the force to the moving member 15.

Such a configuration prevents each of the first levers 31 from being deformed during the operation of opening/closing the valve device 1. Specifically, each of the first levers 31 is not deformed by repetitively receiving a stress, and an elastro-plastic region which may be subjected to such micro-level plastic deformation as to cause fatigue failure is not deformed. Accordingly, even when the number of times the actuator 3 and the valve device 1 are required to be opened/closed is ten million or more, it is possible to provide the actuator 3 and the valve device 1 each having durability and satisfying the requirement.

In addition, since the plurality of first levers 31 are held by the first retainer 32, it is possible to improve the assemblability of the actuator 3 and the valve device 1.

In addition, the drive part includes the piston 21 connected to the spring bearing member 22 and the two coil springs 23 which bias the spring bearing member 22 toward the moving member 15. In such a configuration, the biasing force (drive force) of the coil springs 23 is amplified by the plurality of first levers 31. Consequently, even when the biasing force of the coil springs 23 is small, it is possible to push the diaphragm 11 against the pressure of the fluid flowing in the inflow path 5b and cut off the communication between the inflow path 5b and the outflow path 5c.

Also, in the valve device 1 including the actuator 3 according to the first embodiment, the booster mechanism 30 includes the first lever portion (six first levers 31), the transmission member 33, and the second lever portion (six second levers 34). Each of the first levers 31 is located between the spring bearing portion 22A of the spring bearing member 22 and the transmission member 33 and has the effort portion (inner end portion 31E), the fulcrum portion (outer end portion 31D), and the load portion (portion of the outer portion 31B which comes into contact with the second projecting portion 33C). The transmission member 33 includes the force receiving portion (second projecting portion 33C) which is located between the first lever 31 and the second lever 34 and receives the force from the load portion of the first lever 31 and a transmission portion (third projecting portion 33E) which has the same positional relationship with the force receiving portion as the positional relationship of the effort portion of the first lever 31 with the load portion thereof and transmits the force to the second lever 34. Each of the second levers 34 has the effort portion (inner end portion 34E), the fulcrum portion (outer end portion 34D), and the load portion (portion of the inner portion 34A which comes into contact with the first projecting portion 15E).

In such a configuration, the third projecting portion 33E of the transmission member 33 has the same positional relationship with the second projecting portion 33C thereof as the positional relationship of the inner end portion 31E of the first lever 31 with the outer portion 31B thereof. Accordingly, it is possible to reduce a space in which a leverage structure including a plurality of stages is disposed. Therefore, it is possible to provide the actuator 3 and the valve device 1 each including the small-size and high-magnification booster mechanism 30.

The drive part includes the piston 21 connected to the spring bearing member 22 and the two coil springs 23 which bias the spring bearing member 22 toward the moving member 15. In such a configuration, the biasing force of the coil springs 23 is amplified by the booster mechanism 30. Consequently, even when the biasing force of the coil springs 23 is small, it is possible to push the diaphragm 11 against the pressure of the fluid flowing in the inflow path 5b and cut off the communication between the inflow path 5b and the outflow path 5c.

Next, a description will be given of an actuator and a valve device each according to a second embodiment. Note that the same components as those of the actuator and the valve device each according to the first embodiment are given the same reference numbers, and a description thereof is omitted.

Figure 6:
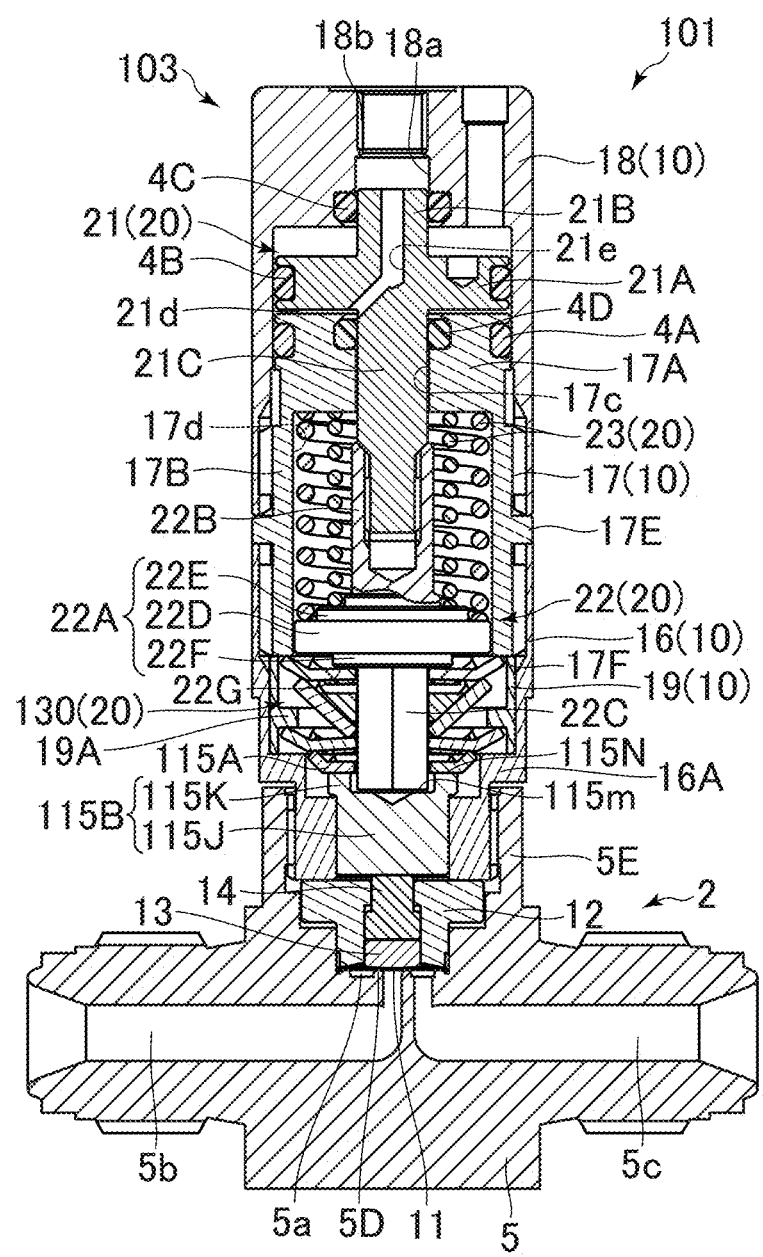
FIG. 6 is a vertical cross-sectional view of a valve device in a closed state according to a second embodiment.

FIG. 6 is a vertical cross-sectional view of a valve device 101 in a closed state in the second embodiment. As illustrated in FIG. 6, the valve device 101 is a diaphragm valve for use in a gas line (e.g., on a most upstream side of the gas line) including the plurality of fluid controllers of the fluid control apparatus 55 (see FIG. 13).

The valve device 101 includes the body portion 2 and an actuator 103. Note that the description will be given below on the assumption that the actuator 103 is on an upper side of the valve device 101, while the body portion 2 is on a lower side of the valve device 101.

The actuator 103 includes the casing 10, the retaining adapter 12, the diaphragm retainer 13, the rod 14, a moving member 115, the drive part 20, and the first to fourth O-rings 4A to 4D.

The moving portion 115 is supported in the lower end portion of the bonnet 16 to be vertically movable.

Next, a description will be given of a booster mechanism 130 and the moving portion 115.

Figure 7:
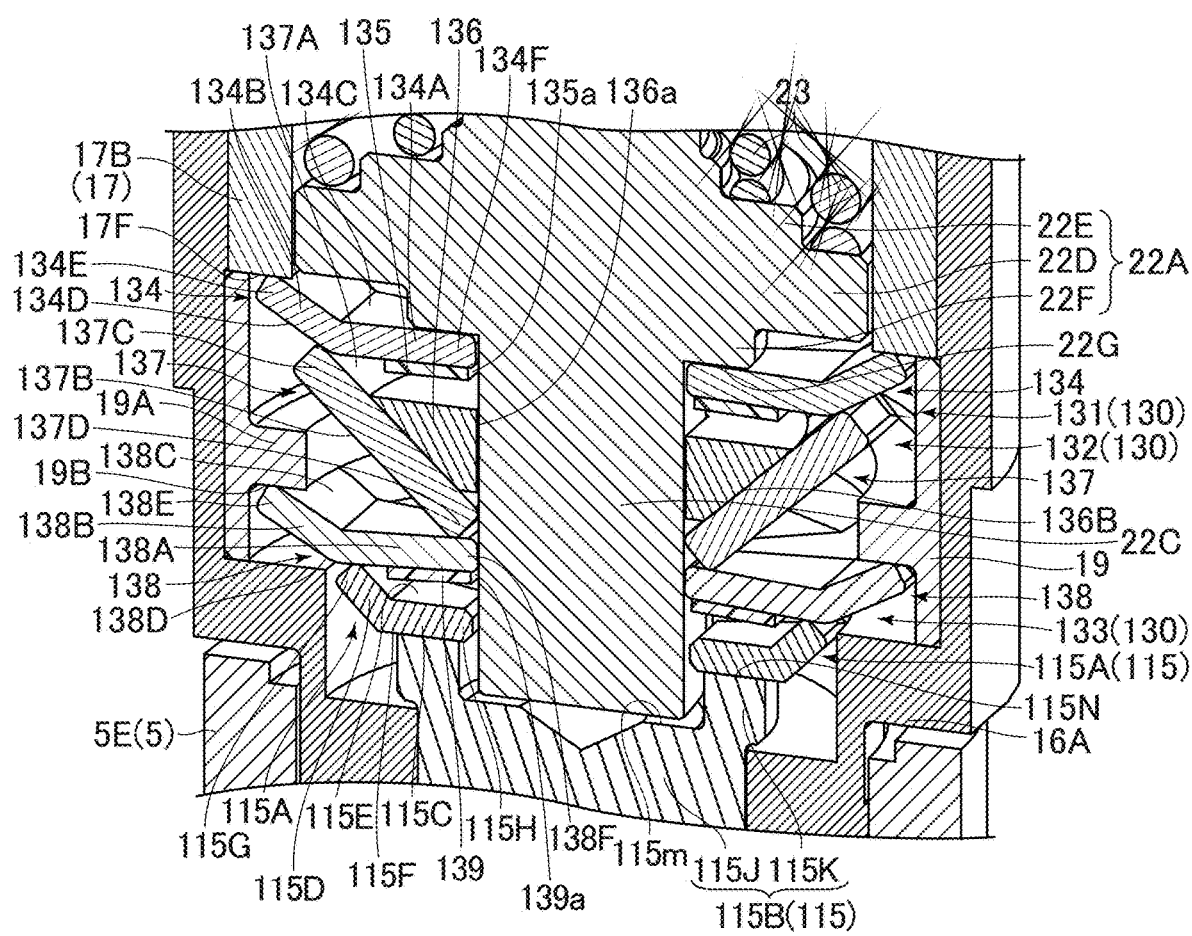
FIG. 7 illustrates a sectional perspective view of the vicinity of a booster mechanism of the valve device according to the second embodiment.
Figure 8:
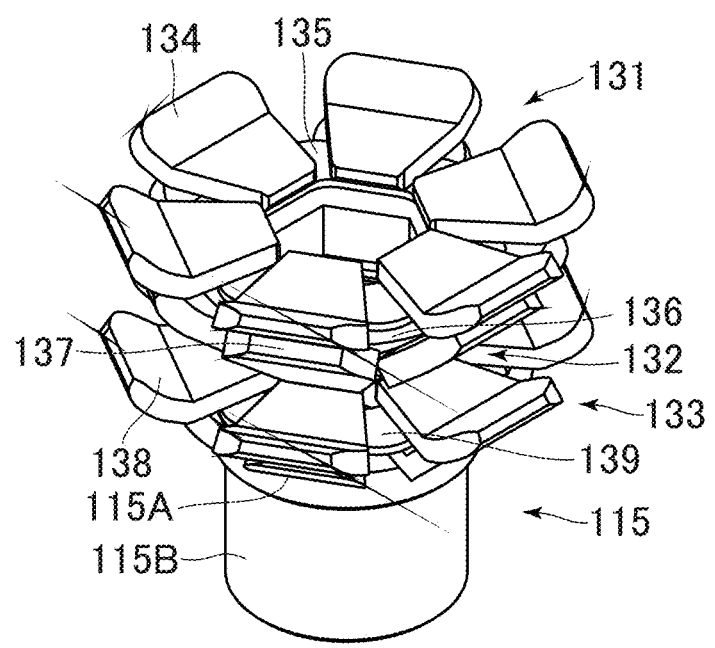
FIG. 8 is a perspective view illustrating a state in which the booster mechanism and a moving portion are assembled.
Figure 9:
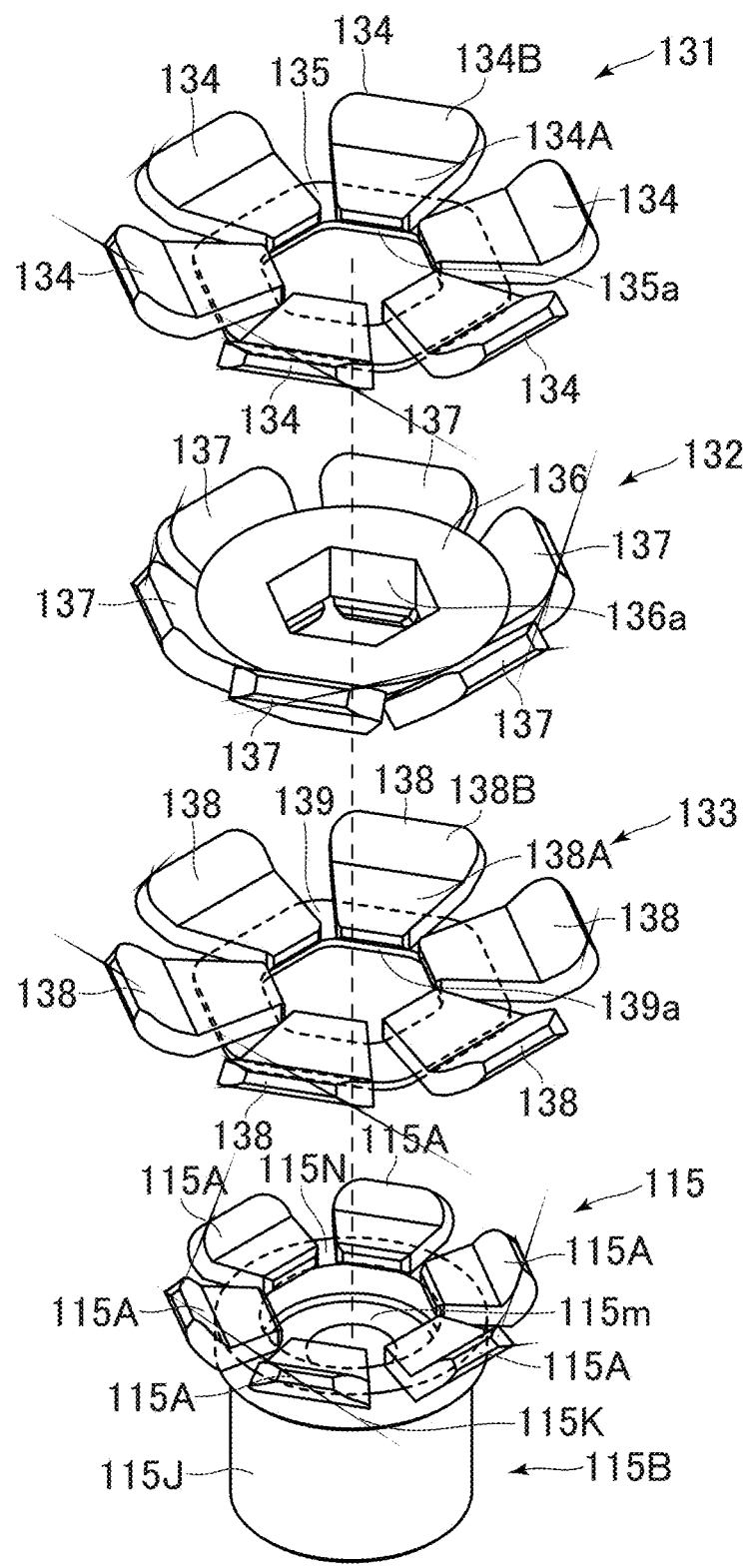
FIG. 9 is an exploded perspective view of the booster mechanism and the moving portion.
Figure 10A:
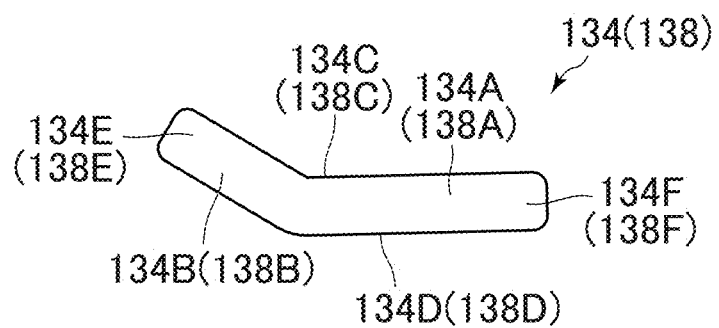
FIG. 10A is a side view of each of the first levers (second levers)
Figure 10B:
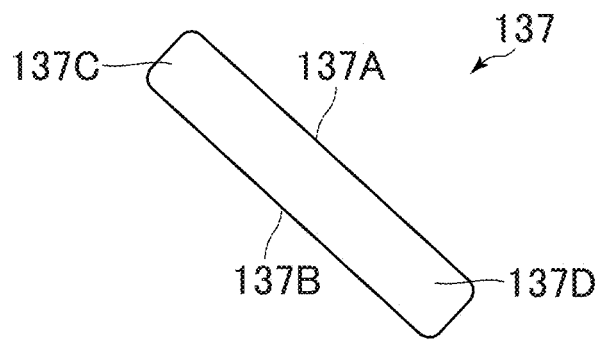
FIG. 10B is a side view of each of first transmission members.
Figure 10C:
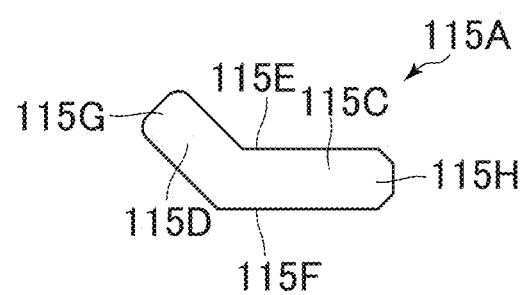
FIG. 10C is a side view of each of second transmission members.

FIG. 7 illustrates a sectional perspective view of the vicinity of the booster mechanism 130. FIG. 8 is a perspective view illustrating a state in which the booster mechanism 130 and the moving portion 115 are assembled. FIG. 9 is an exploded perspective view of the booster mechanism 130 and the moving portion 115. FIG. 10A is a side view of each of first levers 134 (second levers 138). FIG. 10B is a side view of each of first transmission members 137. FIG. 10C is a side view of each of second transmission members 115A.

The booster mechanism 130 includes a first boosting portion 131, a first transmission portion 132, and a second boosting portion 133. As illustrated in FIG. 8, over the moving portion 115, the second boosting portion 133, the first transmission portion 132, and the first boosting portion 131 are stacked in this order.

The first boosting portion 131 includes the six first levers 134 and a first support member 135.

The six first levers 134 are independent of each other, have the same shape, and are equidistantly arranged around the second downwardly extending portion 22C along a circumferential direction of the actuator 103. Each of the first levers 134 is formed of a metal (e.g., stainless steel), a resin, a ceramic, or the like and has hardness which keeps the first lever 134 from being deformed (distorted) during an operation of opening/closing the valve device 101 described later. In other words, each of the first levers 134 functions as a rigid body against the operation of opening/closing the valve device 101.

Each of the first levers 134 includes an inner portion 134A and an outer portion 134B and has a shape tapered from the outer portion 134B toward the inner portion 134A. The outer portion 134B is connected to the inner portion 134A so as to be bent upwardly.

As illustrated in FIG. 10A, each of the first levers 134 has an upper surface 134C and a lower surface 134D. Each of the respective portions of the upper surface 134C and the lower surface 134D forming the inner portion 134A and the outer portion 134B has a planar shape.

Each of outer end portions 134E and inner end portions 134F of the first levers 134 extends so as to be parallel with a tangential direction of a circle around an axis of the actuator 103. As illustrated in FIG. 7, the first levers 134 have the outer end portions 134E in line contact with the lower surface 17F of the intermediate casing 17 and the inner end portions 134F facing the individual surfaces of the regular hexagonal prism of the second downwardly extending portion 22C to be in line contact with the lower surface 22G of the downwardly protruding portion 22F.

The first support member 135 is formed of an elastic material having flexibility such as rubber, has a substantially hexagonal annular shape in plan view, and has an insertion hole 135a formed therein. To the respective portions of the substantially hexagonal shape of the first support member 135 corresponding to the individual sides thereof, the respective inner portions 134A of the first levers 134 are bonded via an adhesive or the like. Thus, the six first levers 134 and the first support member 135 are integrated with each other.

Into the substantially hexagonal insertion hole 135a of the first support member 135, the second downwardly extending portion 22C in the form of the regular hexagonal prism is inserted. Since the insertion hole 135a has a size slightly larger than that of the outer shape of the second downwardly extending portion 22C, the rotation of the first boosting portion 131 relative to the second downwardly extending portion 22C is suppressed.

The first transmission portion 132 is located under the first boosting portion 131 and includes a ring member 136 and the six first transmission members 137. The six first transmission members 137 correspond to a first transmission portion.

The ring member 136 is formed of, e.g., a metal (e.g., stainless steel), a resin, a ceramic, or the like, has an annular shape, and has a regular hexagonal insertion hole 136a formed therein. The ring member 136 has a downwardly tapered outer peripheral surface 136B.

Into the regular hexagonal insertion hole 136a of the ring member 136, the second downwardly extending portion 22C in the form of the regular hexagonal prism is inserted. Since the insertion hole 136a has a size slightly larger than that of the outer shape of the second downwardly extending portion 22C, the rotation of the ring member 136 relative to the second downwardly extending portion 22C is suppressed.

Each of the first transmission members 137 is formed of a plate material made of, e.g., a metal (e.g., stainless steel), a resin, a ceramic, or the like, and has hardness which keeps the first transmission member 137 from being deformed (distorted) during the operation of opening/closing the valve device 101. The first transmission members 137 are independent of each other and have the same shape. As illustrated in FIG. 10B, each of the first transmission members 137 has an upper surface 137A and a lower surface 137B. As illustrated in FIG. 9, the individual first transmission members 137 are equidistantly arranged around the second downwardly extending portion 22C along the circumferential direction of the actuator 103. The respective upper surfaces 137A of the first transmission members 137 are bonded to the outer peripheral surface 136B of the ring member 136 via an adhesive or by brazing or welding. As a result, each of the first transmission members 137 is inclined with respect to an axial direction of the actuator 103 to have an upper end portion 137C thereof located radially outward of a lower end portion 137D thereof.

Each of the upper end portions 137C and the lower end portions 137D of the first transmission members 137 extends so as to be parallel with the tangential direction of the circle around the axis of the actuator 103. As illustrated in FIG. 7, the first transmission members 137 have the upper end portions 137C in contact with the lower surfaces 134D of the outer portions 134B of the first levers 134 and have the lower end portions 137D facing the individual surfaces of the regular hexagonal prism of the second downwardly extending portion 22C. The first transmission members 137 are also configured to be tapered with distance from the upper end portions 137C toward the lower end portions 137D. The upper end portions 137C of the first transmission members 137 correspond to a first contact portion.

The second boosting portion 133 is located under the first transmission portion 132 and has the six second levers 138 and a second support member 139. The six second levers 138 and the second support member 139 have the same configurations/shapes as those of the six first levers 134 and the first support member 135.

Specifically, each of the second levers 138 is formed of a metal (e.g., stainless steel), a resin, a ceramic, or the like and has hardness which keeps the second lever 138 from being deformed (distorted) during the operation of opening/closing the valve device 101 described later and includes an inner portion 138A and an outer portion 138B. Each of outer end portions 138E and inner end portions 138F of the second levers 138 extends so as to be parallel with the tangential direction of the circle around the axis of the actuator 103. As illustrated in FIG. 10A, each of the second levers 138 has an upper surface 138C and a lower surface 138D. Each of the respective portions of the upper surface 138C and the lower surface 138D forming the inner portion 138A and the outer portion 138B has a planar shape.

As illustrated in FIG. 7, the second levers 138 have the outer end portions 138E in line contact with the lower surface 19B of the protruding portion 19A of the support ring 19, while the lower end portions 137D of the first transmission members 137 are in line contact with the upper surfaces 138C of the inner end portions 138F of the second levers 138. The lower end portions 137D of the first transmission members 137 correspond to a second contact portion.

The second support member 139 is formed of an elastic material having flexibility such as rubber, has a substantially hexagonal annular shape in plan view, and has an insertion hole 139a formed therein. To the respective portions of the substantially hexagonal shape of the second support member 139 corresponding to the individual sides thereof, the respective inner portions 138A of the second levers 138 are bonded via an adhesive or the like. Thus, the six second levers 138 and the second support member 139 are integrated with each other.

Into the substantially hexagonal insertion hole 139a of the second support member 139, the second downwardly extending portion 22C in the form of the regular hexagonal prism is inserted. Since the insertion hole 139a has a size slightly larger than that of the outer shape of the second downwardly extending portion 22C, the rotation of the second boosting portion 133 relative to the second downwardly extending portion 22C is suppressed.

The moving portion 115 includes the six second transmission members 115A and a moving member 115B. The six second transmission members 115A correspond to a second transmission portion.

The six second transmission members 115A have the same configurations/shapes as those of the six first levers 134 except that the sizes of the six second transmission members 115A are smaller than those of the six first levers 134.

Specifically, each of the second transmission members 115A is formed of a metal (e.g., stainless steel), a resin, a ceramic, or the like and has hardness which keeps the second transmission member 115A from being deformed (distorted) during the operation of opening/closing the valve device 101 described later and includes an inner portion 115C and an outer portion 115D. Each of outer end portions 115G and inner end portions 115H of the second transmission members 115A extends so as to be parallel with the tangential direction of the circle around the axis of the actuator 103. As illustrated in FIG. 10C, each of the second transmission members 115A has an upper surface 115E and a lower surface 115F. Each of the respective portions of the upper surface 115E and the lower surface 115F forming the inner portion 115C and the outer portion 115D has a planar shape.

As illustrated in FIG. 7, the second transmission members 115A have the outer end portions 115G in line contact with the lower surfaces 138D of the inner portions 138A of the second levers 138, while having the inner end portions 115H facing the individual surfaces of the regular hexagonal prism of the second downwardly extending portion 22C. The outer end portions 115G of the second transmission members 115A correspond to a third contact portion.

The moving member 115B is formed of a metal (e.g., stainless steel), a resin, a ceramic, or the like and includes a cylindrical base portion 115J and a protruding portion 115K.

The cylindrical base portion 115J has a lower surface thereof capable of pushing the rod 14. The protruding portion 115K is provided around an outer peripheral edge of an upper surface of the cylindrical base portion 115J so as to protrude upwardly and outwardly in a radial direction. The protruding portion 115K has an annular shape to form a recessed portion 115m. To an upper surface 115N of the protruding portion 115K, the six second transmission members 115A are fixed via an adhesive or by brazing, welding, or the like so as to be equidistant from each other along the circumferential direction of the actuator 103.

Next, a description will be given of the operation of opening/closing the valve device 101.

Figure 11A:
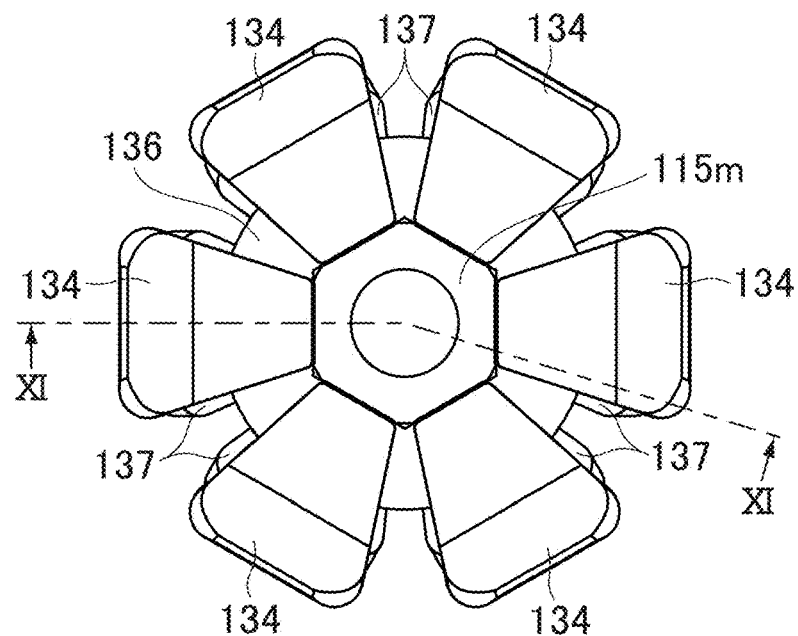
FIG. 11A is a plan view of the booster mechanism and the moving portion when the valve device according to the second embodiment is in the closed state.
Figure 11B:
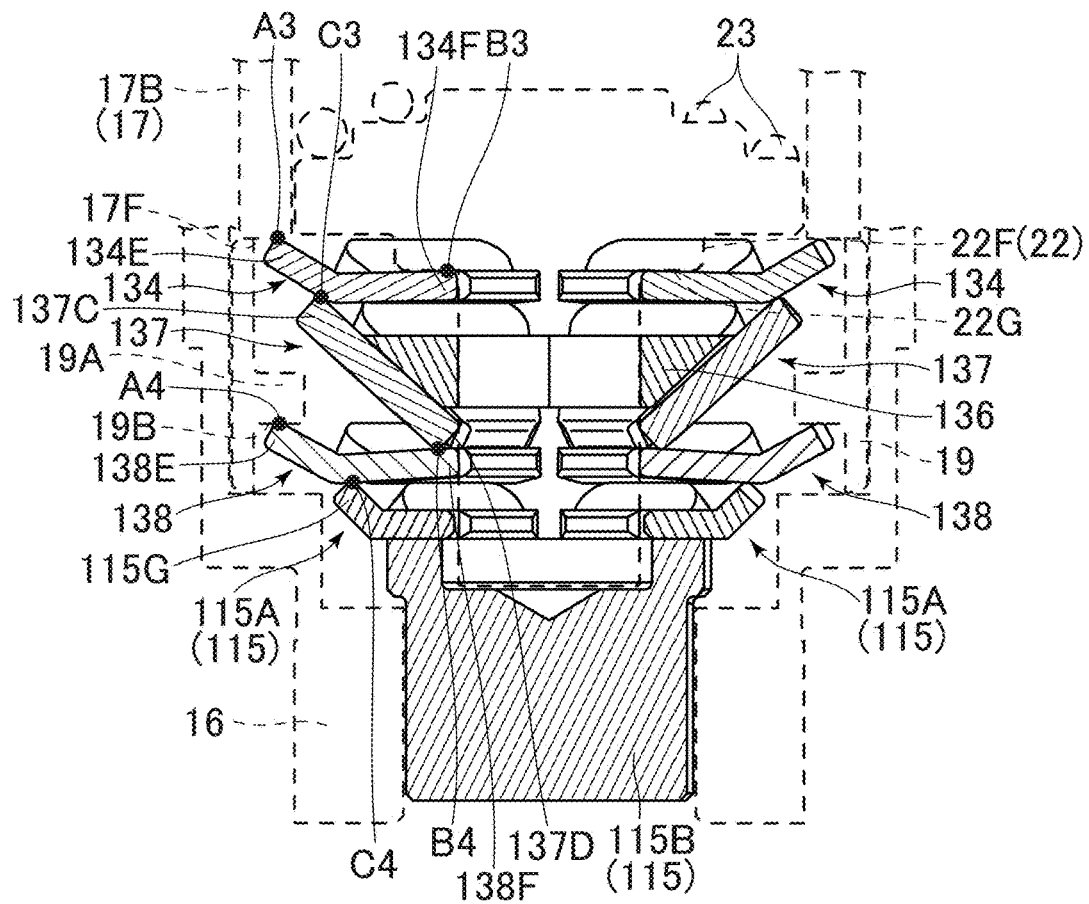
FIG. 11B is a cross-sectional view along a line XI-XI in FIG. 11A.
Figure 12A:
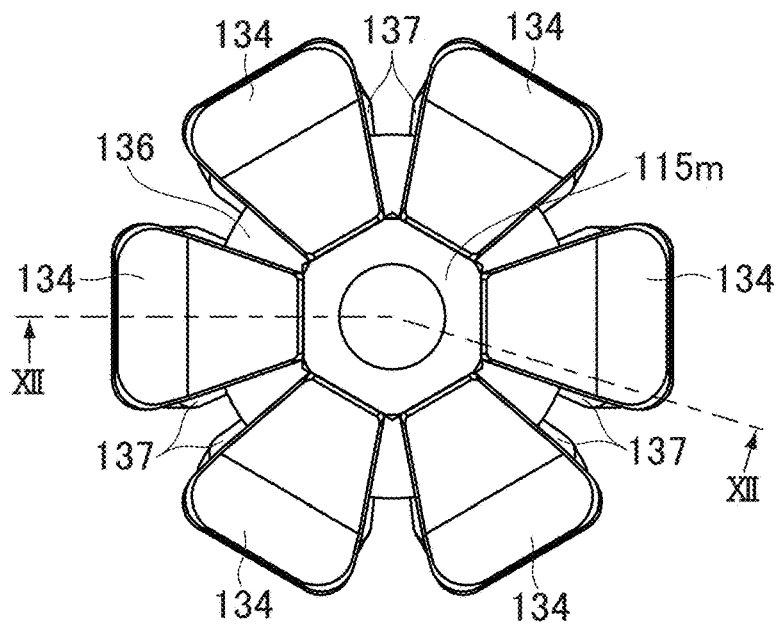
FIG. 12A is a plan view of the booster mechanism and the moving portion when the valve device according to the second embodiment is in the open state.
Figure 12B:
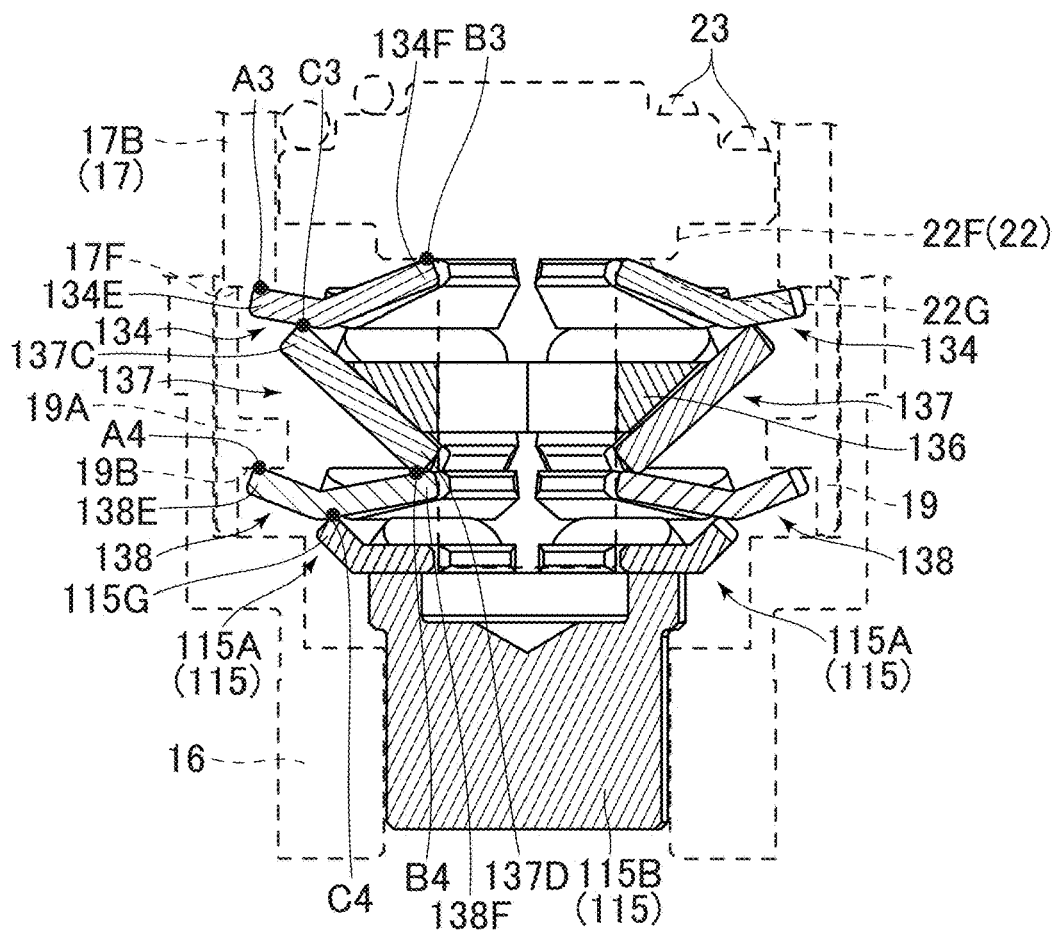
FIG. 12B is a cross-sectional view along a line XII-XII in FIG. 12A.

FIG. 11A is a plan view of the booster mechanism 130 and the moving portion 115 when the valve device 101 is in the closed state, and FIG. 11B is a cross-sectional view along a line XI-XI in FIG. 11A. FIG. 12A is a plan view of the booster mechanism 130 and the moving portion 115 when the valve device 101 is in an open state, and FIG. 12B is a cross-sectional view along a line XII-XII in FIG. 12A. Note that, in FIGS. 11A, 11B, 12A, and 12B, illustration of the first support member 135 and the second support member 139 is omitted.

As illustrated in FIG. 6, when the valve device 101 is in the closed state, the drive fluid has not entered the fluid inlet chamber 21d, and the spring bearing member 22 is downwardly biased by the two coil springs 23 to be located at the lowermost end. When the valve device 101 shifts from the open state illustrated in FIGS. 12A and 12B to the closed state illustrated in FIGS. 11A and 11B, the inner end portion 134F of each of the first levers 134 is pushed by the lower surface 22G of the downwardly protruding portion 22F to cause the first lever 134 to revolve around the outer end portion 134E in contact with the lower surface 17F of the intermediate casing 17. As a result, the upper end portions 137C of the first transmission members 137 in contact with the first levers 134 from below are pushed downward to downwardly move the ring member 136 and the first transmission members 137.

As a result of the downward movement of the first transmission members 137, the inner end portion 138F of each of the second levers 138 is pushed by the lower end portion 137D of the first transmission member 137, and consequently the second lever 138 revolves around the outer end portion 138E in contact with the lower surface 19B of the protruding portion 19A of the support ring 19. As a result, the outer end portions 115G of the second transmission members 115A in contact with the second levers 138 from below are pushed downward to downwardly move the moving member 115B of the moving portion 115.

Since the moving member 115B downwardly pushes the rod 14 and the rod 14 downwardly pushes the diaphragm retainer 13, the diaphragm 11 is pushed to come into contact with the valve seat 5D and cut off the communication between the inflow path 5b and the outflow path 5c. Note that, since each of the first support member 135 and the second support member 139 is formed of an elastic material, as a result of the revolution of each of the first levers 134 and the second levers 138, each of the first support member 135 and the second support member 139 is deformed so as to increase/reduce respective diameters of an outer peripheral portion and an inner peripheral portion of each of the first support member 135 and the second support member 139.

In the second embodiment, the two coil springs 23 are configured such that a force (drive force) to push the spring bearing portion 22A of the spring bearing member 22 is boosted by the booster mechanism 130 to push the moving member 115. Specifically, the force is boosted by the principle of leverage using a contact portion A3 of the outer end portion 134E of each of the first levers 134 in contact with the lower surface 17F of the intermediate casing 17 as a fulcrum point, using a contact portion B3 of the inner end portion 134F of the first lever 134 in contact with the lower surface 22G of the downwardly protruding portion 22F as an effort point, and using a contact portion C3 of the outer portion 134B of the first lever 134 in contact with the upper end portion 137C of the first transmission member 137 as a load point, and the boosted force is transmitted to the first transmission member 137. Thus, the inner end portion 134F of the first lever 134 corresponds to an effort portion, the outer end portion 134E of the first lever 134 corresponds to a fulcrum portion, and the portion of the outer portion 134B of the first lever 134 in contact with the upper end portion 137C of the first transmission member 137 corresponds to a load portion.

The force is further boosted by the principle of leverage using a contact portion A4 of the outer end portion 138E of each of the second levers 138 in contact with the lower surface 19B of the protruding portion 19A of the support ring 19 as a fulcrum point, using a contact portion B4 of the inner end portion 138F of the second lever 138 in contact with the lower end portion 137D of the first transmission member 137 as an effort point, and using a contact portion C4 of the inner portion 138A of the second lever 138 in contact with the outer end portion 115G of the second transmission member 115A as a load portion, and the boosted force is transmitted to the moving member 115. Note that the inner end portion 138F of the second lever 138 corresponds to an effort portion, the outer end portion 138E of the second lever 138 corresponds to a fulcrum portion, and the portion of the inner portion 138A of the second lever 138 in contact with the outer end portion 115G of the second transmission member 115A corresponds to a load portion.

Thus, the two coil springs 23 are configured such that the biasing force thereof is boosted by the booster mechanism 130 to push the moving member 115. Accordingly, even when the biasing force of the two coil springs 23 is small, it is possible to push the diaphragm 11 against the pressure of the fluid flowing in the inflow path 5b and cut off the communication between the inflow path 5b and the outflow path 5c.

In addition, as a result of introduction of the drive fluid into the fluid inlet chamber 21d via the fluid inflow path 18a and the fluid inlet path 21e, an upward force resulting from an air pressure acts on the piston 21 and on the spring bearing member 22. This force is increased to be larger than the biasing force of the two coil springs 23 to upwardly move the piston 21 and the spring bearing member 22. As a result, there is no force pushing the moving member 115B, and consequently the diaphragm 11 is lifted by each of the pressure of the fluid flowing in the inflow path 5b and a restorative force of the diaphragm 11 to move away from the valve seat 5D and open the valve.

At this time, as a result of the lifting of the diaphragm 11, the diaphragm retainer 13 and the rod 14 are lifted, and the moving member 115 is also lifted. Consequently, as illustrated in FIGS. 12A and 12B, each of the second levers 138 is pushed upward by the outer end portion 115G of the second transmission member 115A to revolve around the outer end portion 138E thereof, and the inner end portion 138F is lifted. As a result, the lower end portion 137D of the first transmission member 137 is pushed upward by the inner end portion 138F of the second lever 138, and each of the first levers 134 is pushed upward by the upper end portion 137C of the first transmission member 137 to revolve around the outer end portion 134E thereof, and the inner end portion 134F is lifted.

Note that, as the air pressure required to open the valve, an air pressure slightly larger than the biasing force of the two coil springs 23 is sufficient. Since the biasing force of the two coil springs 23 can be reduced by the booster mechanism 130, the air pressure required to open the valve may be low.

As described above, in the valve device 101 including the actuator 103 according to the second embodiment, the first boosting portion 131 includes the plurality of first levers 134, and the plurality of first transmission members 137 corresponding to the first transmission portion are provided correspondingly to the plurality of first levers 134. Each of the first levers 134 has the effort portion (inner end portion 134F) which receives the force from the spring bearing member 22, the fulcrum portion (outer end portion 134E) which comes into contact with the lower surface 17F of the intermediate casing 17 to serve as the center of the revolution of the first lever 134, and the load portion (portion of the outer portion 134B which comes into contact with the upper end portion 137C of the first transmission member 137) which transmits the force to the first transmission member 137. Each of the first transmission members 137 has the first contact portion (upper end portion 137C) which comes into line contact with the load portion of the first lever 134.

In such a configuration, each of the first transmission members 137 comes into line contact, not point contact, with the first lever 134. This can prevent the force from being concentrated on the respective portions of the first lever 134 and the first transmission member 137 which are in contact with each other. Consequently, even when the number of times the actuator 103 and the valve device 101 are required to be opened/closed is, e.g., ten million or more, it is possible to provide the actuator 103 and the valve device 101 each having excellent durability and satisfying the requirement.

Also, in the valve device 101 including the actuator 103 according to the second embodiment, the second boosting portion 133 includes the plurality of second levers 138 provided correspondingly to the first transmission members 137, and the plurality of second transmission members 115A corresponding to the second transmission portion are provided correspondingly to the plurality of second levers 138. Each of the second levers 138 has the effort portion (inner end portion 138F) which receives the force from the first transmission member 137, the fulcrum portion (outer end portion 138E) which comes into contact with the lower surface 19B of the protruding portion 19A of the support ring 19 to serve as the center of the revolution of the second lever 138, and the load portion (portion of the inner portion 138A which comes into contact with the outer end portion 115G of the second transmission member 115A) which transmits the force to the second transmission member 115A. Each of the first transmission members 137 has the second contact portion (lower end portion 137D) which comes into line contact with the effort portion of the second lever 138. Each of the second transmission members 115A has the third contact portion (outer end portion 115G) which comes into line contact with the load portion of the second lever 138.

In such a configuration, each of the first transmission members 137 comes into line contact, not point contact, with the second lever 138. This can prevent the force from being concentrated on the respective portions of the second lever 138 and the first transmission member 137 which are in contact with each other. Likewise, each of the second transmission members 115A comes into line contact, not point contact, with the second lever 138. This can prevent the force from being concentrated on the respective portions of the second lever 138 and the second transmission member 115A which are in contact with each other.

Consequently, even when the number of times the actuator 103 and the valve device 101 are required to be opened/closed is, e.g., ten million or more, it is possible to provide the actuator 103 and the valve device 101 each having excellent durability and satisfying the requirement.

Next, a description will be given of the fluid control apparatus 55 in which the valve devices 1 and 101 described above are to be used and of a semiconductor manufacturing device 60 including the fluid control apparatus 55.

Figure 13:
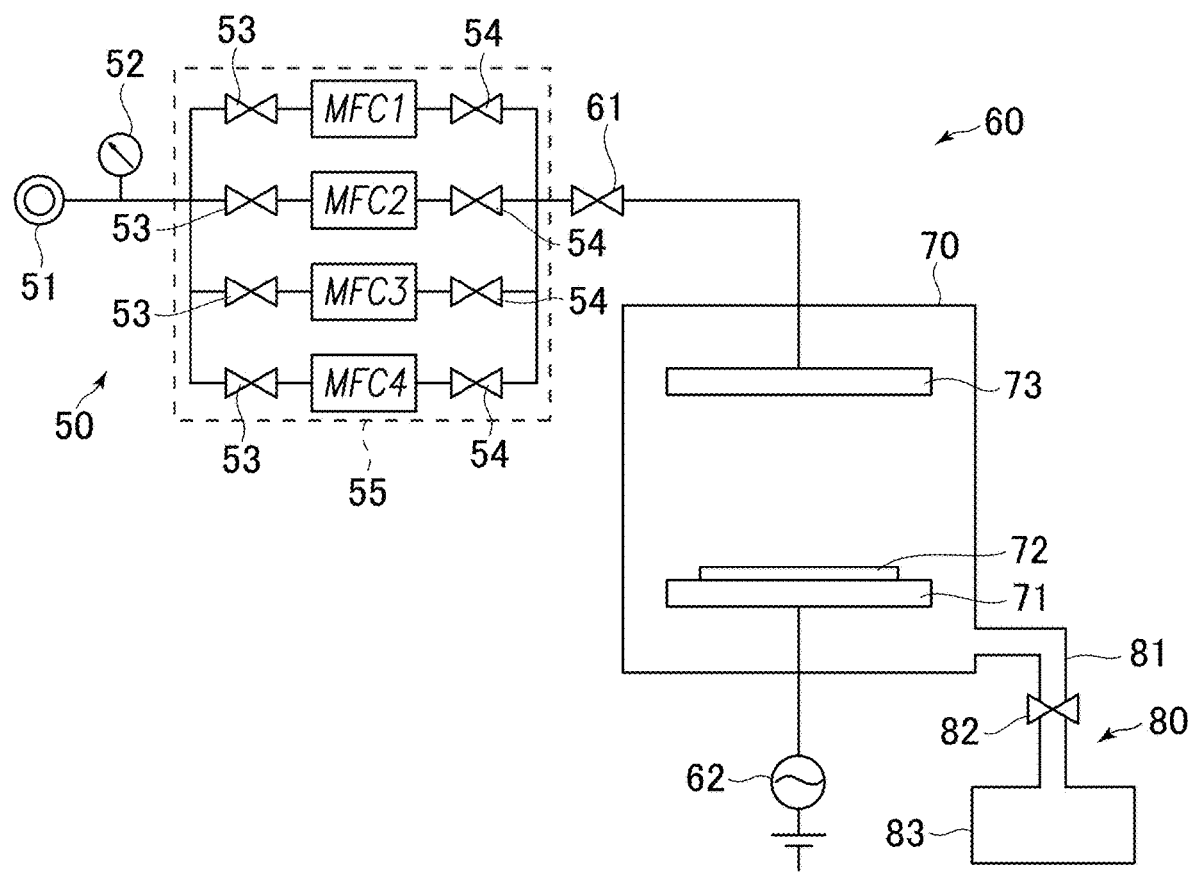
FIG. 13 illustrates a schematic diagram of a semiconductor manufacturing device.

FIG. 13 is a schematic diagram of the semiconductor manufacturing device 60. For example, the semiconductor manufacturing device 60 is a CVD device which includes a gas supply part 50 including the fluid control apparatus 55, a vacuum chamber 70, and an exhaust part 80 and forms a passivation film (oxide film) over a wafer.

The gas supply part 50 includes a gas supply source 51, a manometer 52, and the fluid control apparatus 55. The fluid control apparatus 55 has a plurality of gas lines formed of a plurality of fluid controllers and includes, as the fluid controllers, open/close valves 53 and 54 and mass flow controllers (MFCs) 1 to 4. Between the gas supply part 50 and the vacuum chamber 70, an open/close valve 61 is provided. The vacuum chamber 70 includes a mounting table 71 for mounting thereon a wafer 72 and an electrode 73 for forming a thin film over the wafer 72. The vacuum chamber 70 is connected to a commercial power source 62. The exhaust part 80 includes an exhaust pipe 81, an open/close valve 82, and a dust collector 83.

When a thin film is formed over the wafer 72, by opening/closing the open/close valves 53, 54, and 61 and using the MFCs 1 to 4, a supply of the gas to the vacuum chamber 70 is controlled. When a powder and granular material generated as a by-product during the formation of the thin film over the wafer 72 is to be removed, the open/close valve 82 is brought into an open state, and the powder and granular material is removed by the dust collector 83 via the exhaust pipe 81.

To the open/close valves 53, 54, 61, and 82, the valve devices 1 and 101 according to the embodiments described above can be applied. As described above, each of the valve devices 1 and 101 has the excellent durability, and accordingly it is possible to provide the fluid control apparatus 55 having excellent durability. In addition, since the valve devices 1 and 101 include the actuators 3 and 103 having the small-size booster mechanisms 30 and 130, it is consequently possible to reduce the size of the fluid control apparatus 55.

While the description has been given heretofore of the case where the semiconductor manufacturing device 60 is the CVD device, the semiconductor manufacturing device 60 may also be a sputtering device or an etching device. The etching device (dry etching device) includes a processing chamber, a gas supply part (fluid control apparatus), and an exhaust part and processes a surface of a material or the like using a corrosive action exerted by a reactive gas. The sputtering device includes a target, a vacuum chamber, a gas supply part (fluid control apparatus), and an exhaust part and deposits a film over a surface of a material.

Note that the present disclosure is not limited to the embodiments described above. It will be understood by those skilled in the art that a variety of additions, modifications, and the like are within the scope of the present disclosure.

For example, the booster mechanism 30 in the embodiment described above includes the six first levers 31, the first retainer 32, the transmission member 33, the six second levers 34, and the second retainer 35. However, the booster mechanism 30 may also include only the six first levers 31 and the first retainer 32 or include only the six first levers 31. The number of the first levers 31 included in the booster mechanism 30 is six, but it is sufficient that the number of the first levers 31 included in the booster mechanism 30 is not less than two.

While the booster mechanism 30 includes the six first levers 31, the first retainer 32, the transmission member 33, the six second levers 34, and the second retainer 35, the booster mechanism 30 need not necessarily include the first retainer 32 and the second retainer 35. While each of the first lever portion and the second lever portion includes the six members independent of each other, the six first levers 31 or the six second lever 34 may also have an integral structure in which the six first levers 31 or the six second levers 34 are connected at respective inner peripheral edges or outer peripheral edges thereof. In this case, the first lever 31 or the second lever 34 may also be formed of a material such as a metal or a resin which is deformed with the movement of the spring bearing member 22 and the transmission member 33.

Meanwhile, the booster mechanism 130 in the embodiment described above includes the first boosting portion 131, the first transmission portion 132, and the second boosting portion 133. However, the booster mechanism 130 may also include only the first boosting portion 131 and the first transmission portion 132 or include only the first boosting portion 131. When the booster mechanism 130 includes only the first boosting portion 131 and the first transmission portion 132, it may also be possible that the lower end portions 137D of the first transmission members 137 push the inner portions 115C of the second transmission members 115A or the moving portion 115 is not provided with the six second transmission members 115A and the lower end portions 137D of the first transmission members 137 push the protruding portion 115K of the moving member 115B.

The number of the first levers 134 included in the first boosting portion 131 is six, but it is sufficient that the number of the first levers 134 included in the first boosting portion 131 is not less than two. It is sufficient that each of the number of the first transmission member 137, the number of the second levers 138, and the number of the second transmission members 115A is the same as the number of the first levers 134.

The two coil springs 23 are used as the biasing part, but a disc spring may also be used as the biasing part. The two coil springs 23 are configured to be provided under the piston 21 and bias the spring bearing member 22, but the two coil springs 23 may also be configured to be provided over the piston 21 and bias the spring bearing member 22 from above the piston 21.

In the embodiments described above, the drive part is configured to include the piston 21 and the two coil springs 23, but the drive part may also be configured otherwise. Also, in the embodiment described above, the actuator 3 is configured to include the retaining adapter 12, the diaphragm retainer 13, and the rod 14, but the actuator 3 need not necessarily include the retaining adapter 12, the diaphragm retainer 13, and the rod 14. The valve seat 5D is formed of the same metal material as that forming the body 5, but the valve seat 5D may also be formed of an embedded annular sheet made of a resin.

What is claimed is:

1. An actuator comprising:
   a casing;

a reciprocating member provided in the casing to be reciprocatable;

a drive part provided in the casing to drive the reciprocating member;

a booster mechanism which is configured to amplify a drive force applied by the drive part to the reciprocating member; and a moving member which is configured to move on receiving the force amplified by the booster mechanism, wherein the booster mechanism includes a plurality of levers which are arranged in a circumferential direction of the moving member and are configured to be not deformed when the drive force is amplified, each of the levers has an effort portion which is configured to receive the force from the reciprocating member, a fulcrum portion which is configured to come into contact with the casing to serve as a center of a revolution of the lever, and a load portion which is configured to transmit the force to the moving member, the plurality of levers include a plurality of first levers, the booster mechanism includes:
  a first boosting portion which is configured to boost the drive force applied by the drive part to the reciprocating member; and
  a first transmission portion which is configured to transmit the force boosted by the first boosting portion, the first boosting portion included the plurality of first levers arranged in a circumferential direction of the reciprocating member, the first transmission portion includes a plurality of first transmission members provided correspondingly to the plurality of first levers, each of the first levers has an effort portion which is configured to receive the force from the reciprocating member, a fulcrum portion which is configured to come into contact with the casing to serve as a center of a revolution of the first lever, and a load portion which is configured to transmit the force to the first transmission member; and each of the first transmission members has a first contact portion which is configured to come into line contact with the load portion of the first lever.

2. The actuator according to claim 1, wherein the effort portion corresponds to an inner end portion of each of the levers, the fulcrum portion corresponds to an outer end portion of each of the lever, and the load portion is located between the inner end portion and the outer end portion.

3. The actuator according to claim 1, wherein the booster mechanism includes a retainer which holds the plurality of levers.

4. The actuator according to claim 1, wherein
the plurality of levers further include a plurality of second levers, the booster mechanism further includes:
  a second boosting portion which is configured to amplify the force transmitted by the first transmission portion; and
  a second transmission portion which is configured to transmit the force amplified by the second boosting portion to the moving member, the second boosting portion includes the plurality of second levers provided correspondingly to the first transmission members, the second transmission portion includes a plurality of second transmission members provided correspondingly to the plurality of second levers, each of the second levers has an effort portion which is configured to receive the force from the first transmission portion, a fulcrum portion which is configured to come into contact with the casing to serve as a center of a revolution of the second lever, and a load portion which is configured to transmit the force to the second transmission member, each of the first transmission members has a second contact portion which is configured to come into line contact with the effort portion of the second lever, and each of the second transmission members has a third contact portion which is configured to come into line contact with the load portion of the second lever.

5. The actuator according to claim 1, wherein the drive part includes:
  a piston which is configured to be driven by a drive fluid supplied from an outside and connected to the reciprocating member; and
  a biasing portion which is configured to bias the reciprocating member toward the moving member.

6. A valve device comprising:
a body in which a fluid passage is formed;
a valve body which is configured to open and close the fluid passage;
a casing which is connected to the body;
a reciprocating member provided in the casing to be reciprocatable;
a drive part provided in the casing to drive the reciprocating member;
a booster mechanism which is configured to amplify a drive force applied by the drive part to the reciprocating member; and
a moving member which is configured to move closer to and away from the body to cause the valve body to open and close the fluid passage, and is configured to move on receiving the force amplified by the booster mechanism, wherein the booster mechanism includes a plurality of levers which are arranged in a circumferential direction of the moving member and are configured to be not deformed when the drive force is amplified, each of the levers has an effort portion which is configured to receive the force from the reciprocating member, a fulcrum portion which is configured to come into contact with the casing to serve as a center of a revolution of the lever, and a load portion which is configured to transmit the force to the moving member, the plurality of levers include a plurality of first levers, the booster mechanism includes:
  a first boosting portion which is configured to boost the drive force applied by the drive part to the reciprocating member; and
  a first transmission portion which is configured to transmit the force boosted by the first boosting portion, the first boosting portion included the plurality of first levers arranged in a circumferential direction of the reciprocating member, the first transmission portion includes a plurality of first transmission members provided correspondingly to the plurality of first levers, each of the first levers has an effort portion which is configured to receive the force from the reciprocating member, a fulcrum portion which is configured to come into contact with the casing to serve as a center of a revolution of the first lever, and a load portion which is configured to transmit the force to the first transmission member; and each of the first transmission members has a first contact portion which is configured to come into line contact with the load portion of the first lever.

7. The valve device according to wherein the plurality of levers further include a plurality of second levers, the booster mechanism further includes:
  a second boosting portion which is configured to amplify the force transmitted by the first transmission portion; and
  a second transmission portion which is configured to transmit the force amplified by the second boosting portion to the moving member, the second boosting portion includes the plurality of second levers provided correspondingly to the first transmission members, the second transmission portion includes a plurality of second transmission members provided correspondingly to the plurality of second levers, each of the second levers has an effort portion which is configured to receive the force from the first transmission portion, a fulcrum portion which is configured to come into contact with the casing to serve as a center of a revolution of the second lever, and a load portion which is configured to transmit the force to the second transmission member, each of the first transmission members has a second contact portion which is configured to come into line contact with the effort portion of the second lever, and each of the second transmission members has a third contact portion which is configured to come into line contact with the load portion of the second lever.

8. A fluid control apparatus comprising a plurality of fluid controllers, at least one of the plurality of fluid controllers being the valve device according to claim 6.

* * * * *